July 8, 1952    C. W. FLOSS ET AL    2,602,547
FULL FLOW OIL FILTER

Filed Sept. 19, 1947    2 SHEETS—SHEET 1

C. W. FLOSS
J. K. GILBERT
INVENTORS

BY

ATTORNEYS.

July 8, 1952 C. W. FLOSS ET AL 2,602,547
FULL FLOW OIL FILTER
Filed Sept. 19, 1947 2 SHEETS—SHEET 2

C. W. FLOSS
J. K. GILBERT
INVENTORS

BY

ATTORNEYS.

Patented July 8, 1952

2,602,547

UNITED STATES PATENT OFFICE 2,602,547

FULL FLOW OIL FILTER

Carl W. Floss, Grosse Pointe, and Julian K. Gilbert, Dearborn, Mich., assignors to Ford Motor Company, Dearborn, Mich., a corporation of Delaware Application September 19, 1947, Serial No. 775,068

2 Claims. (Cl. 210—164)

This application is concerned with the art of filtering lubricating oil, and more particularly with an oil filter adapted to filter the lubricant employed in an internal-combustion engine. The necessity of filtering or otherwise purifying the lubricant for internal-combustion engines has long been recognized, and some device for accomplishing such purification is to be found on most modern engines. Such a purifying device has usually taken the form of a filtering element connected between the oil pump and oil reservoir and arranged to continuously filter a certain amount of the lubricant and return such filtered lubricant directly to the oil reservoir. The main lubrication circulatory system was of course independent of the filtration system so that at best only a small portion of the oil in the system was in the process of filtration at any one time.

Recently there has been a tendency to replace the above-described sampling or by-pass filter arrangement with the so-called "full flow" filter system. In this system, normal operation contemplates that all of the oil reaching the moving parts of the engine must first pass through the filter. Thus only clean oil can normally reach the moving parts and a reduction in engine wear is achieved. The instant application is concerned with this "full flow" type of filter.

It is immediately apparent that unless some provision to the contrary is made, the eventual clogging up of a "full flow" oil filter will result in a cessation of the flow of oil to the moving parts and consequent injury or destruction of the engine. Many expedients have been suggested and tried to circumvent this difficulty, with varying degrees of success. In the instant invention, applicant has provided a novel arrangement for eliminating this trouble in "full flow" oil filters.

Accordingly, it is an object of this invention to provide a "full flow" oil filter in which it is impossible for clogging of the filtering element to result in a failure of the oil supply to the moving parts.

It is a further object of this invention to provide a "full flow" oil filter in which the entire filter assembly remains full of oil even when the engine is inoperative for long periods of time.

It is a further object of this invention to provide a "full flow" oil filter with a continuous bleed opening to provide for a rapid warming of the filter during cold weather operation.

It is a further object of this invention to provide a "full flow" oil filter in which the presence of water in the lubricating oil cannot cause the valve system to operate improperly in freezing weather.

It is a further object of this invention to provide a "full flow" oil filter in which it is impossible for the by-pass valve to become stuck in such a position that the oil supply to the engine would be interrupted.

With these and other objects in view, the invention comprises the arrangements, constructions, and combinations of the various elements of the structure described in the specification, claimed in the claims and illustrated in the accompanying drawings, in which:

Figure 1:
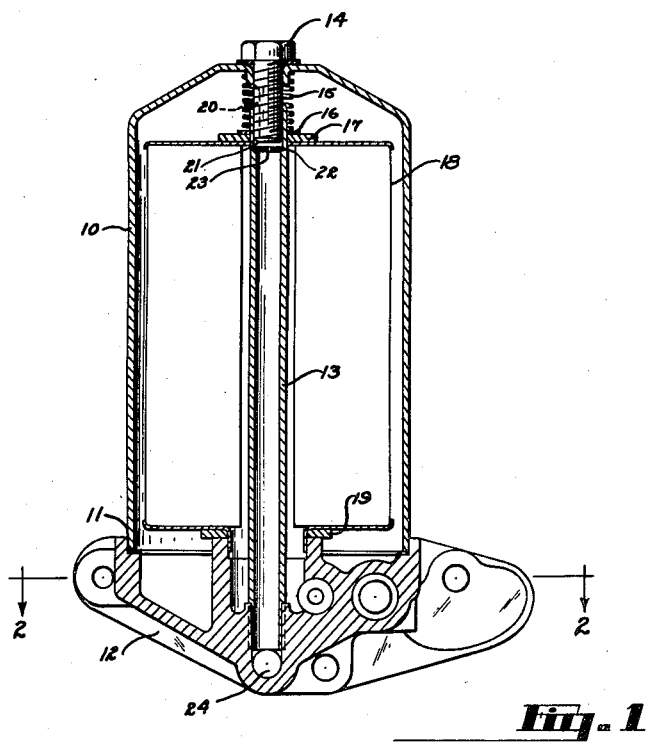
Figure 1 is a vertical section of one form of applicants' filter. This view is taken facing the engine.

The vertical cross section shown in Figure 1 depicts cylindrical container 10 supported by gasket 11 on base casting 12. Central pipe 13 is secured to base casting 12 and extends vertically to a point just beneath the top of container 10. The upper end of central pipe 13 is threaded internally to receive bolt 14 which is normally surrounded by spiral spring 15. Spiral spring 15 rests upon metal washer 16 which in turn rests upon gasket 17. Cylindrical filter element 18 is thus resiliently supported between gasket 17 at its upper surface and gasket 19 at its lower surface. Bolt 14 is vertically slotted to provied slot 20 opening into space 21. The lower boundary of space 21 is disc 22 in which is drilled metering orifice 23. The lower end of central pipe 13 opens into conduit 24 which terminates against a corresponding opening in the engine block which leads to the crankcase.

Figure 2:
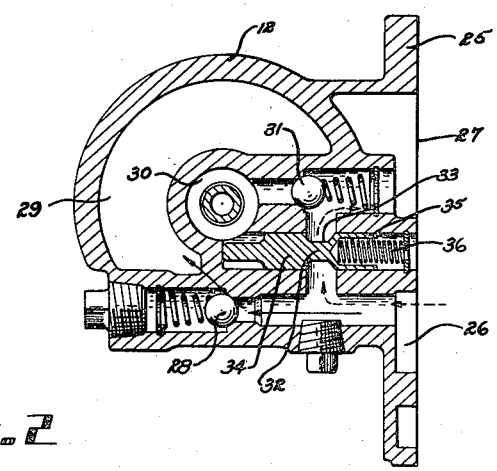
Figure 2 is a horizontal section of the valve mechanism taken on the line 2—2 in Figure 1.

Figure 2 depicts a section of the valve mechanism and base casting taken along the line 2—2 of Figure 1. Face 25 of base casting 12 is machined to be roughly parallel to the axis of central pipe 13 and contains apertures designed to discharge oil from and return oil to the filtering element. Face 25 in service is bolted against a corresponding face machined in the engine block. Oil is received from the oil pump into compartment 26 and discharged to the moving parts of the engine through compartment 27. In normal operation the oil received into compartment 26 flows past spring loaded check valve 28 into space 29 as shown by the solid arrows. Space 29 connects directly with the annular space between container 10 and filter element 18 and then flows inwardly and radially through filter element 18 and discharges into the annular space between pipe 13 and the interior of filter element 18. This last-mentioned annular space mates with space 30. From space 30 the filtered lubricant flows past spring loaded valve 31 and into compartment 27 and thence into the oil gallery of the engine. By-pass valve 32 is provided to enable the lubrication system of the engine to function under abnormal conditions. In its open position, by-pass 32 provides a direct channel of communication from compartment 26 to compartment 27 without the necessity of passage through filter element 18. By-pass valve 32 comprises a dumbbell shaped member 33 terminating at one end in piston 34 and at the other end in piston 35. Spring 36 urges member 33 into the open position. The face of piston 34 remote from face 25 is open to and acted upon by the lubricant pressure existing in space 30. This force opposes the force exerted by spring 36 and tends to close by-pass valve 32. The tension of spring 36 and the area of piston 34 are so selected that oil will flow as indicated by the broken arrows whenever the pressure differential between compartment 26 and compartment 27 is less than 20 pounds per square inch.

Figure 3:
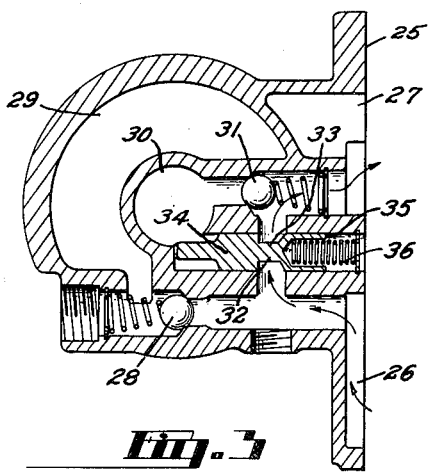
Figure 3 is a diagrammatic showing of the valve mechanism when the pressure generated by the oil pump is very low or when such pressure is zero.

From a consideration of the above description, it is thought that the action of the filter valve mechanism under each of the circumstances shown diagrammatically in Figures 3 to 6 can be understood. Figure 3 represents the valve mechanism in the positions assumed when the motor is stopped or idling, or when for any reason the oil pressure is very low. Under these circumstances spring 36 forces by-pass valve 32 into a fully open position and permits a copious direct flow from compartment 26 to compartment 27 even under low oil pressure. Under these circumstances no flow of oil will occur through filter element 18 and the engine will have the full benefit of all of the oil available from the oil pump. It will be noted that valves 28 and 31 are closed and hence the oil filter will not drain into the crankcase when the motor is not running. This is a decided advantage, since otherwise no oil would be available to the bearing after starting until the oil pump had refilled the oil filter. Thus the engine would be deprived of oil immediately at starting, a time when oil is most urgently needed.

Figure 4:
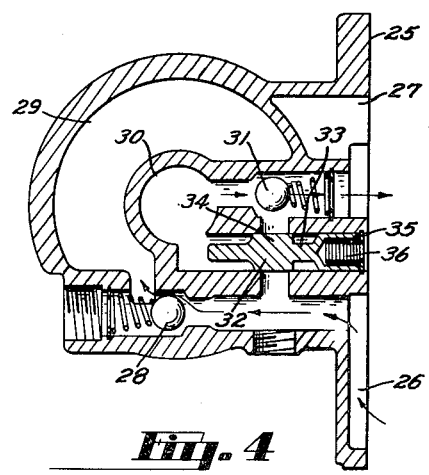
Figure 4 is similar to Figure 3 and shows the valve positions when operating with a clean filtering element.

Figure 4 shows the position of the valves during normal operation with a clean filter element. With a clean filter element, the pressure drop through the element should not greatly exceed two pounds per square inch. Thus a pressure in compartment 26 of 50 pounds per square inch would give a pressure in compartment 27 of about 48 pounds per square inch. This high pressure will force by-pass valve 32 completely closed against the spring pressure and compel all lubricant to pass through the filtering medium before entering the engine. It will be noted that this oil flow has caused valves 28 and 31 to open.

Figure 5:
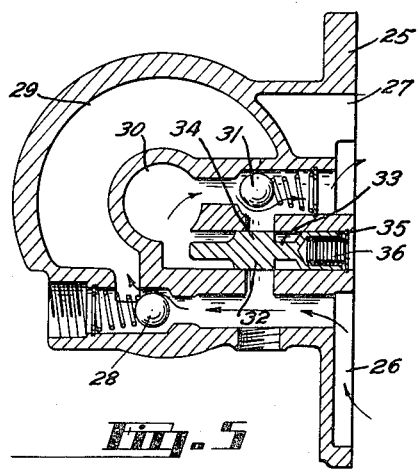
Figure 5 is similar to Figure 3 and shows the valve positions when operating with a dirty, but still operable filtering element.
Figure 6:
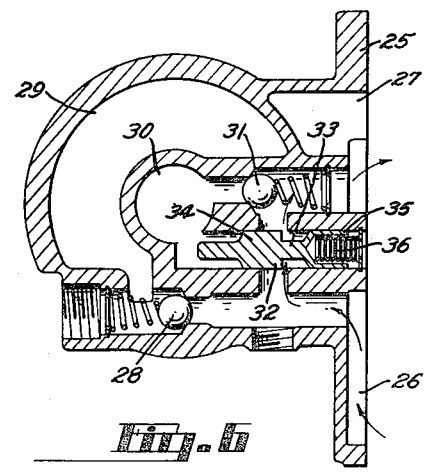
Figure 6 is similar to Figure 3 and shows the valve positions when operating with a clogged and inoperable filtering element.

Figure 5 depicts normal engine operation with a partially plugged filtering element. Figure 5 differs from Figure 4 only in that it shows a partially plugged instead of a clean filtering element. With such a partially plugged filtering element, a normal flow of oil to the engine will engender a pressure drop in the neighborhood of 20 pounds per square inch. Thus a pressure of 50 pounds per square inch in compartment 26 would decrease to 30 pounds per square inch in compartment 27. The spring in by-pass valve 32 is so adjusted that this lower pressure is just adequate to keep by-pass valve 32 closed. Any further drop in pressure below 30 pounds per square inch will permit by-pass valve 32 to open and conduct oil directly from compartment 26 to compartment 27. This condition has been illustrated in Figure 6 in which the operation of the filter with an abnormally dirty filtering element is shown. To cause the valves to assume the position shown, the pressure drop through the filtering element would be such as to give a pressure on the downstream side of 25 pounds per square inch. This pressure is insufficient to hold by-pass valve 32 closed against the spring pressure and oil passes directly through the valve. Valve 31 of course closes and prevents oil from reaching the downstream side of the filter element except by passing through the element. In this way fluctuation of by-pass valve 32 is avoided.

As shown in Figure 1, slot 20 and metering orifice 23 are provided especially for rapid warm-up in cold weather. This arrangement provides for a small but continuous shunt flow of warm oil from the crankcase over the exterior of the filtering element, through slot 20 and metering orifice 23 and thence back to the crankcase. This flow is too small to interfere with the operation of the lubrication system or the oil filter, but is adequate to provide for a rapid warming of the filtering element from cold starts.

We claim as our invention:

1. A full flow oil filter comprising an oil inlet, an oil outlet, a check valve located in the oil inlet and another check valve located in the oil outlet, and a by-pass valve interconnecting the oil inlet and the oil outlet and shunting the oil filtering element, said by-pass valve being spring biased into a position permitting free flow between the oil inlet and the oil outlet until the oil pressure in the oil outlet has reached a predetermined minimum and being arranged to shut off oil flow through the by-pass when the oil pressure in the oil outlet exceeds the predetermined minimum.

2. A full flow oil filter comprising an oil inlet, an oil outlet, a check valve located in the oil inlet and another check valve located in the oil outlet, and a by-pass valve interconnecting the oil inlet and the oil outlet and shunting the oil filtering element, said by-pass valve comprising a dumbbell shaped element arranged for axial movement, said element being exposed on one end to the oil pressure existing in the oil outlet and on the other end to the opposing pressure of a spring and having a central restricted portion in register with a passageway connecting the oil inlet and oil outlet whereby oil is freely permitted to flow from the oil inlet to the oil outlet until a predetermined minimum pressure has been established in the oil outlet.

CARL W. FLOSS.
JULIAN K. GILBERT.

REFERENCES CITED

The following references are of record in the file of this patent:

UNITED STATES PATENTS

| Number | Name | Date |
| --- | --- | --- |
| 1,948,479 | Caminez | Feb. 20, 1934 |
| 1,969,033 | Redner | Aug. 7, 1934 |
| 2,056,756 | Wiedhofft | Oct. 6, 1936 |
| 2,106,863 | Whitney | Feb. 1, 1938 |
| 2,134,385 | Winslow | Oct. 25, 1938 |
| 2,253,684 | Burckhalter | Aug. 26, 1941 |
| 2,365,766 | Levier | Dec. 26, 1944 |
| 2,423,329 | Le Clair | July 1, 1947 |
| 2,429,321 | La Brecque | Oct. 21, 1947 |